United States Patent
Charles et al.

(10) Patent No.: US 7,677,663 B1
(45) Date of Patent: Mar. 16, 2010

(54) SAFETY SEAT ASSEMBLY

(76) Inventors: David Charles, North Miami, FL (US);
Anthony Charles, legal representative, 1950 S. Hibiscus Dr., North Miami, FL (US) 33181; Jose Abella, 1030 NE. 196 St., Miami, FL (US) 33179; Wayne Wingate, 10314 NE. 189th St., Bothell, WA (US) 98011

(*) Notice: Subject to any disclaimer, the term of this patent is extended or adjusted under 35 U.S.C. 154(b) by 0 days.

(21) Appl. No.: 11/904,598

(22) Filed: Sep. 27, 2007

(51) Int. Cl.
*A47C 1/08* (2006.01)
*A47C 1/00* (2006.01)

(52) U.S. Cl. .................. 297/256.12; 297/325; 297/327; 297/217.7; 297/280; 297/340; 297/344.1; 114/363

(58) Field of Classification Search ............ 297/256.12, 297/217.7, 423.1, 461, 325–327, 280, 344.14, 297/344.1; 114/363, 366, 191, 194, 343
See application file for complete search history.

(56) References Cited

U.S. PATENT DOCUMENTS

| | | | | |
|---|---|---|---|---|
| 3,705,745 A | * | 12/1972 | Ambrosius | 297/308 |
| 4,254,991 A | * | 3/1981 | Venieris | 297/344.18 |
| 4,337,544 A | * | 7/1982 | Coulter et al. | 114/357 |
| 4,694,770 A | * | 9/1987 | Kitner et al. | 114/123 |
| 4,936,629 A | * | 6/1990 | Young | 297/256.12 |
| 5,119,754 A | * | 6/1992 | Martinez et al. | 114/363 |
| 5,509,719 A | * | 4/1996 | Cone, II | 297/344.14 |
| 6,435,611 B1 | * | 8/2002 | Walter | 297/316 |
| 7,252,336 B2 | * | 8/2007 | Frisina | 297/340 |

* cited by examiner

*Primary Examiner*—David Dunn
*Assistant Examiner*—Erika Garrett
(74) *Attorney, Agent, or Firm*—Malloy & Malloy, P.A.

(57) ABSTRACT

An assembly for safely supporting an occupant in a vehicle such as, but not limited to, a watercraft and including a seat assembly and a support frame. A connector assembly is disposed and structured to movably interconnect the seat assembly to said support frame along a first rotational axis. A mount assembly is connected to the vehicle and includes an attachment assembly disposed and structured to movably interconnect the support frame to the mount assembly along a second rotational axis. The support frame and the connector assembly associated therewith as well as the mount assembly and the attachment assembly associated therewith are cooperatively disposed and structured to orient said first and second rotational axes in substantially perpendicular relation to one another, such that the seat assembly will be able to move in a substantially gimbal-like fashion relative to the movement of the vehicle while traveling.

18 Claims, 5 Drawing Sheets

SAFETY SEAT ASSEMBLY

BACKGROUND OF THE INVENTION

1. Field of the Invention

This invention relates to a safety seat assembly designed primarily, but not exclusively, for use on a watercraft. A support frame supports and movably connects the seat assembly about a first rotational axis and an attachment assembly movably connects the support frame, about a second rotational axis, to a mount assembly secured to the vehicle, wherein the first and second rotational axes are disposed in substantially perpendicular relation to one another.

2. Description of the Related Art

The use of safety seats, particularly including child seats is universally recognized as an important and even necessary accessory for protecting children and infants traveling in motor vehicles. Moreover, the use of some type of supporting seat assembly for children is mandated by either state or local regulations. As such, relatively sophisticated structural advancements have been made in the design and operative features of child safety seats in an effort to better protect a child occupant against trauma in emergency situations. In addition, such advancements are also directed to the use of lightweight, high strength materials which not only serve to protect an infant but facilitate the installation and removal of the safety seat from an intended location within a motor vehicle.

In spite of the various improvements found in modern day, commercially available child safety seats, the basic function thereof is to at least partially enclose and thereby protect the occupant against forcible trauma. In addition a common goal of such devices is to retain the child within the vehicle, typically through the use of various types of restraining harness and like devices. However, even in light of the widespread use and availability of child safety seats, they are not normally designed and structured to maintain the child in a predetermined orientation during unusual or extreme movements of the vehicle during travel, except of course when the vehicle is involved in a collision. By way of example, when an automobile or like motor vehicle is involved in a sharp turn at relatively high speeds, the safety seat and child occupant is subjected to relatively strong lateral forces which tend to displace the occupant from an intended comfortable and protected position. Similar forces are exerted on the seat structure and child occupant during deceleration as well as unusual acceleration of the vehicle. During such relatively extreme movements of the vehicle, conventional safety seats do not normally adapt to the tendency of the seat and occupant to be displaced from a preferred, normally intended orientation.

Another category of vehicles for which known or conventional child safety seats are generally considered to be unsatisfactory is marine craft. More specifically, it is of course known to include various floatation devices on pleasure boats as well as other watercraft. As such, floatation devices are available which are specifically designed for infants and small children. However, there is a general lack of product development in the area of child safety seats or occupant supporting structures specifically intended to protect a child on a marine craft, which are also capable of maintaining an occupant in an above surface, floating position in an emergency situation.

It is acknowledged that safety seats or like supporting structures incorporating some type of floatation assembly are known. However, such devices typically lack sufficient structural versatility to include the operative features of absorbing shock in emergency situations while maintaining the child occupant in a preferred orientation during unusual movements of the watercraft, such as during harsh weather conditions, high speed turns or other unusual maneuvers. Of course it is well recognized that relatively small boats encounter numerous conditions while traveling which exert lateral or swaying forces on the watercraft. Such forces are transferred to the occupants, requiring the use of restraint devices or necessitating that the occupants brace themselves. Obviously, small children and infants normally would not have the strength or the foresight to assume a restraining position or take other protective measures during unusual maneuvering or other conditions which would effect the swaying, tilting, etc. of the boat.

Therefore there is a need in the area of child safety for a seat or other occupant support structure capable of protecting an occupant, regardless of age, against forcible trauma, while simultaneously maintaining the occupant in a preferred, substantially upright position normally assumed by an occupant when traveling in a vehicle. In addition such a device should be specifically, but not exclusively, adaptable for use on a marine craft so as to protect a child occupant against drowning during emergency conditions.

SUMMARY OF THE INVENTION

The present invention is directed to a safety seat assembly structured to comfortably maintain an occupant in a seated position and a substantially upright orientation while seated during the travel of the vehicle in which the safety seat is disposed. Further, at least one embodiment of the safety seat assembly and the cooperative components associated therewith are specifically, but not exclusively, intended for use with a marine craft or like water traveling vehicle. As such, a seat assembly of the present invention includes a housing having an open interior dimensioned and configured to receive an occupant therein in at least partially enclosed relation to an exterior of the housing.

A support frame is connected to the seat assembly and includes a connector assembly disposed in interconnecting relation to the support frame and the seat assembly. As such, the connector assembly is structured to facilitate rotational or pivotal movement of the seat assembly about a first rotational axis. In a preferred embodiment, to be described in greater detail hereinafter, the support frame includes a substantially bifurcated configuration or construction including two arms disposed in outwardly extending, spaced relation to one another. Further, each of the two arms is pivotally or rotationally connected to opposite sides of the seat assembly. Moreover, the two arms are rotationally interconnected to the seat assembly by different connecting structures comprising operative portions of the connector assembly. Accordingly, the two connector structures define the aforementioned first rotational axis.

In addition, a mount assembly is fixedly connected, at least in part, to the vehicle and includes an attachment assembly as a part thereof. The attachment assembly rotationally or pivotally interconnects the support frame to a remainder or base portion of the mount assembly, wherein the base portion is fixedly interconnected to the vehicle, as set forth above. In addition, the attachment assembly is structured and disposed to at least partially define a second rotational axis about which the support frame and accordingly the seat assembly are allowed to rotate or pivot.

Cooperative structuring and positioning of the connector assembly, including the two connecting structures, and the attachment assembly, serve to define the first rotational axis and the second rotational axis being oriented in a substantially perpendicular orientation to one another. In addition the first rotational axis and the second rotational axis may also be oriented to substantially intersect as schematically represented hereinafter. As such, the seat assembly can be accurately described as having a generally "gimbal-like" motion in response to the movement of the watercraft through the water. Such a gimbal-like motion will thereby maintain the seat assembly, as well as an occupant contained therein, in the aforementioned preferred upright orientation regardless of any side to side and/or forward and aft movement of the watercraft during its travel.

The versatility of the safety seat assembly of the present invention is further demonstrated by at least one preferred embodiment which includes a pedestal having anchoring plate or like portion fixedly secured to a floor area of the watercraft or like vehicle. The pedestal also includes an elongated stanchion or shaft having a support plate on the opposite or upper end thereof to which the base portion of the mount assembly is fixedly attached. Accordingly, in this embodiment the seat assembly being supported cooperatively and collectively by both the mount assembly and the support frame, is disposed in a spaced, suspended orientation relative to the floor as well as the side walls or bulk heads of the watercraft or other vehicle. This suspended orientation not only adds comfort to the occupant of the seat assembly but also facilitates the ability of the seat assembly to move through the aforementioned "gimbal-like" motion in order to maintain the seat assembly and the occupant in the preferred upright orientation.

In contrast, the mount assembly is structurally adapted to be fixedly interconnected or otherwise secured to a bulk head or side wall portion of the vehicle when a pedestal is not being used. In such an additional embodiment the mount assembly extends laterally outward from a side portion of the watercraft, rather than being suspended or disposed in spaced relation above the floor or deck portion thereof. When laterally attached to a bulk head or side wall in this manner, the aforementioned gimbal-like motion of the seat assembly is still facilitated to accommodate or overcome the complex motions of the craft as it travels through a body of water.

Another feature further demonstrating the versatility of the safety seat assembly of the present invention is the provision of a float assembly disposed on the housing of the seat assembly. Accordingly, in one preferred embodiment the housing of the seat assembly comprises a substantially rigid, molded or otherwise appropriately formed structure. As such, the float assembly includes a closed or sealed chamber having a hollow interior and extending preferably about opposite sides as well as the back of the housing. Therefore, the air or enclosed spaced within the closed and/or sealed chamber will serve to buoyantly support the seat assembly when it is disposed in a body of water. Further, the disposition and overall structure of the float assembly is such as to maintain the seat assembly in an "occupant-safe" orientation relative to the surface of the body water which allows the occupant to breathe when the seat assembly is so buoyantly supported.

Additional structural and operative features of the various preferred embodiments of the safety seat assembly of the present invention include an automatic detachment of the seat assembly from the support frame and accordingly from the vehicle. Such a detachment feature offers additional safety features to an occupant of the seat assembly, especially in emergency situations, wherein the interior of the vehicle becomes swamped or flooded with water. More specifically, when a quantity of water has entered the interior of the watercraft sufficient to enable the float assembly to buoyantly support the seat assembly thereon, an automatic detachment of the seat assembly from the support frame will occur. Such detachment will occur upon the seat assembly assuming any one of a plurality of inclined or angular orientations while being buoyantly supported. Such inclined or angular orientations of the seat assembly, relative to the support frame will, be predetermined and generally representative of a lateral incline of the water vehicle and/or an orientation of the water vehicle represented by a dangerously low or high bow or stern orientation. Any of these orientations of the watercraft, may result in a swamping or flooding of the interior of the watercraft. Such flooding will result in the aforementioned float assembly buoyantly supporting the seat assembly, at least initially, in any one of a plurality of predetermined angular inclinations. When so angularly inclined the automatic detachment of the seat assembly from the support frame and the further automatic orientation of the seat assembly in the aforementioned occupant safe orientation once buoyantly supported on a body of water will occur.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As represented in the accompanying figures, the present invention is directed to a safety seat assembly generally indicated as 10 intended to safely support and maintain an occupant, preferably in a seated position, on the interior of a vehicle, which is not shown for purposes of clarity. Further, the safety seat assembly 10 of the present invention is primarily, but not exclusively, intended for use on a watercraft and is operatively structured to overcome and/or accommodate various movements of the watercraft as it travels over a body of water, even during rough water conditions.

Figure 1:
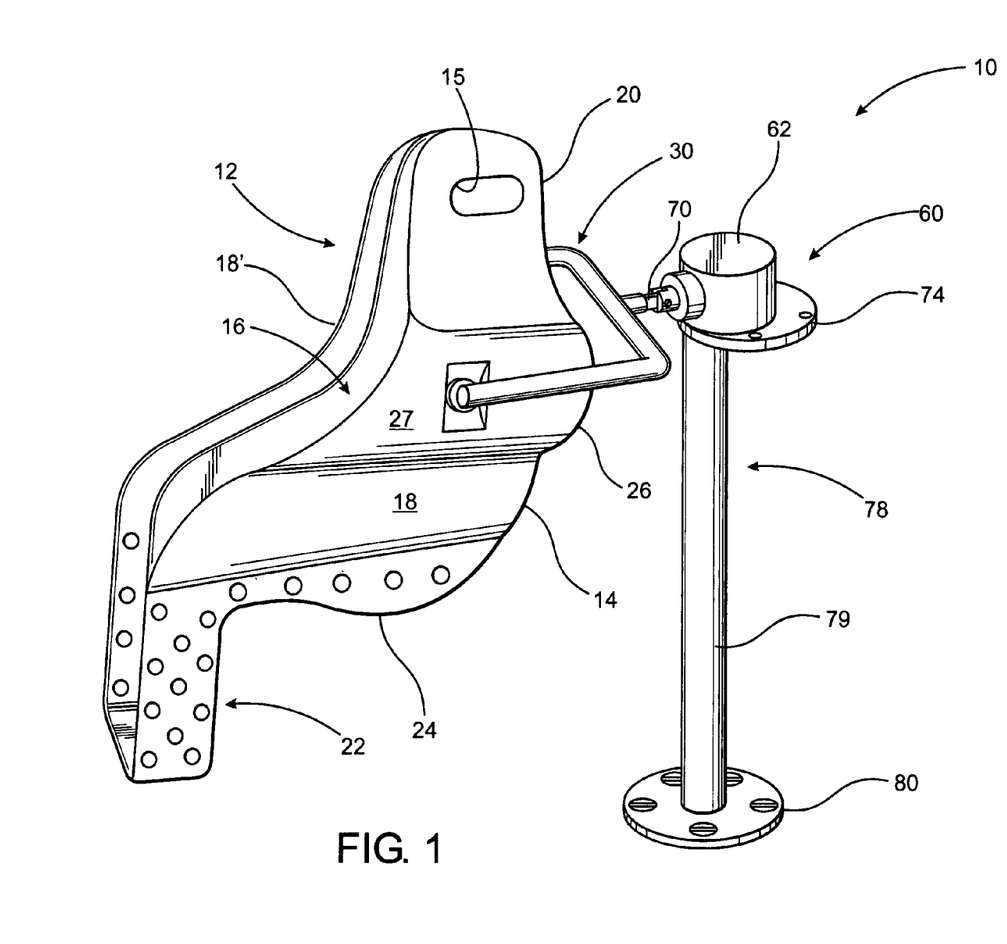
FIG. 1 is a perspective view of one preferred embodiment of the safety seat assembly of the present invention associated with a pedestal type anchoring facility intended to be secured to the interior of a watercraft or other vehicle.
Figure 2:
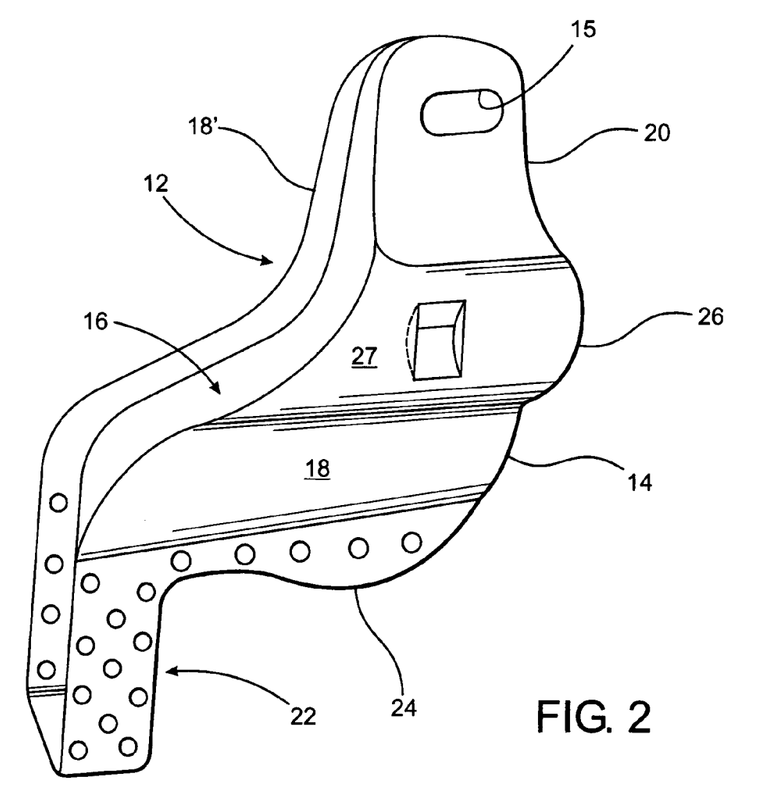
FIG. 2 is a perspective view of a seat assembly of the embodiment of FIG. 1 of the present invention.

More specifically, the safety seat assembly 10 of the present invention comprises a seat assembly generally indicated as 12 having a housing 14 with an open front interior 16 in which an occupant such as, but not limited to, a child is seated in an at least partially enclosed position. The housing 14 may also include a handle 15 or like structure disposed to facilitate the carrying or other manipulation of the seat assembly 12. As will be explained in greater detail hereinafter, the housing 14 of the seat assembly 12 is preferably formed from a plastic, fiber glass or other appropriate substantially rigid material and includes opposite side portions 18 and 18' and a back portion 20. Further, a foot support and/or step is generally indicated as 22 and is disposed, dimensioned and structured to serve as a support for the feet of an occupant while seated within the open interior 16. This foot support 22 may also serve as a step or like structure which facilitates the entry of an occupant into the open interior 16. It is also noted that the foot rest 22 may be included as an integral or fixed part of an undercarriage 24 which may have an aperture construction as represented in FIGS. 1 and 2. Such an apertured construction accomplishes a reduction in the weight of the under portion 24 and footrest 22. As such, a majority of the weight and/or center of gravity of the housing 14 may be appropriately disposed to facilitate the buoyant support of the seat assembly 12 on a body of water, in an "occupant-safe" orientation, such as during emergency conditions.

In order to accomplish the aforementioned buoyant support of the seat assembly 12, the housing 14 further includes a float assembly generally indicated as 26. The float assembly 26 is preferably structured to be an integral part of the housing 14 and may be more specifically defined by a closed or sealed structure extending around both sides 18 and 18' as well as the back 20 of the housing 14. The float assembly 26 is preferably structured, filled or otherwise formed of a foam material or other sufficiently buoyant material which is disposed, dimensioned and structured to maintain the seat assembly in a floating position, with an occupant therein, relative to the surface of the body of water during an emergency condition, as set forth in greater detail hereinafter.

Figures 3, 3A:
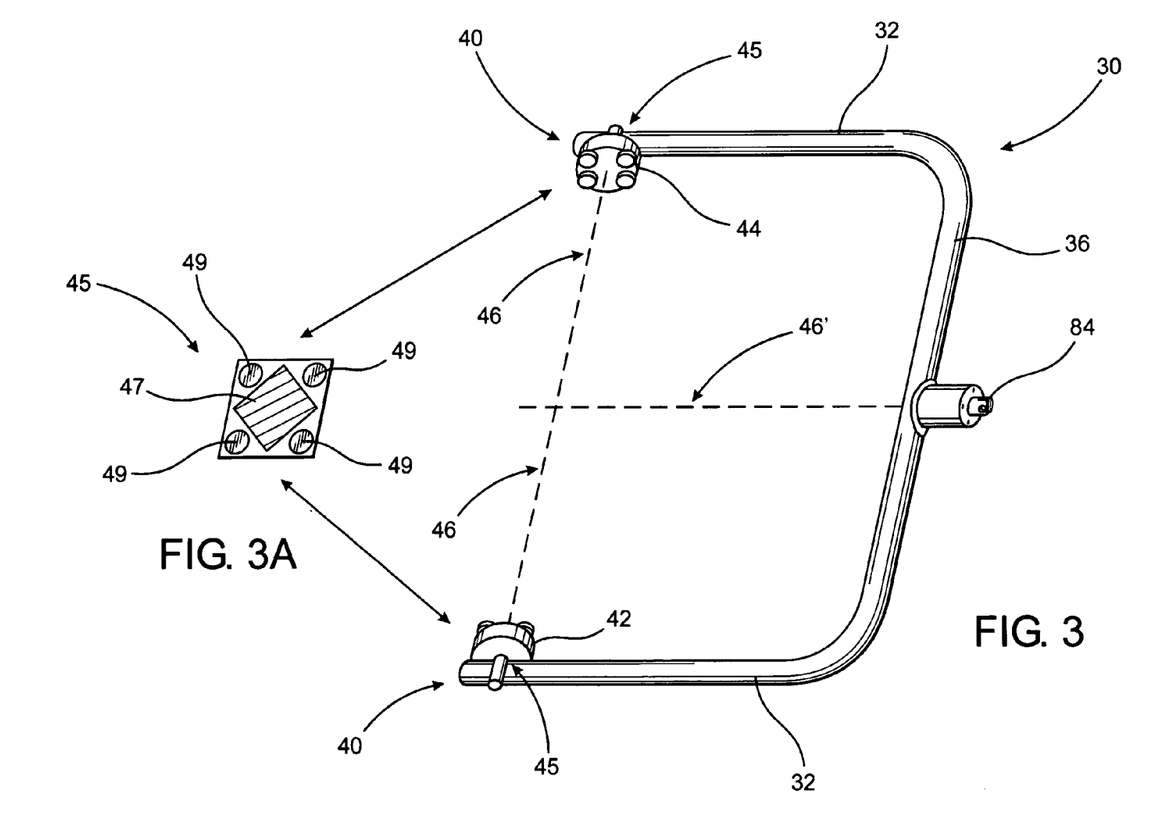
FIG. 3 is a perspective view of a support frame of the embodiment of FIG. 1, for rotationally supporting the seat assembly.
FIG. 3A is a detailed, sectional view of structural components associated with the support frame of the embodiment of FIG. 3.

With primary reference to FIGS. 1 and 3, additional structural and operative features of the safety seat assembly 10 include the provision of a support frame generally indicated as 30. The support frame 30 preferably includes a bifurcated configuration or construction including two spaced apart arms 32 and 34 and an interconnecting brace member or portion 36. The support frame 30 is rotatably or pivotally connected to the seat assembly 12, such that it is allowed to rotate or pivot about a first rotational axis 46, through a predetermined range of motion, between the arms 32 and 34, as schematically represented in FIG. 3A. This rotational or pivotal interconnection is accomplished by a connector assembly generally indicated as 40 comprising two spaced apart connecting structures 42 and 44 each connected to or otherwise disposed on corresponding arms 32 and 34 of the support frame 30. Each of the connecting structures 42 and 44 is structured to be rotationally connected to opposite sides 18 and 18' of the housing 14 of the seat assembly 12 thereby facilitating its pivotal or rotational movement about the first rotational axis 46 as schematically represented in FIG. 3.

FIG. 3A represents a mounting structure 45 which serves to secure the connecting structures 42 and 44 to the corresponding ends of the arms 32 and 34 of the frame 30. More specifically, a square or other appropriate multi-sided member 47 is attached to the rear portion of the respective connecting structures 42 and 44 and is disposed and structured to interact with the shock absorbing members 49. Accordingly, movement of the member 47 in almost any direction will cause it to engage and compress correspondingly disposed ones of the shock absorbing members 49. Therefore, at least some movement of the connecting structures 42 and 44, relative to the ends of the arms 32 and 34 will be permitted, as various forces are applied to the seat assembly 12 because of movement of the craft on which the seat assembly 12 is disposed.

Figure 4:
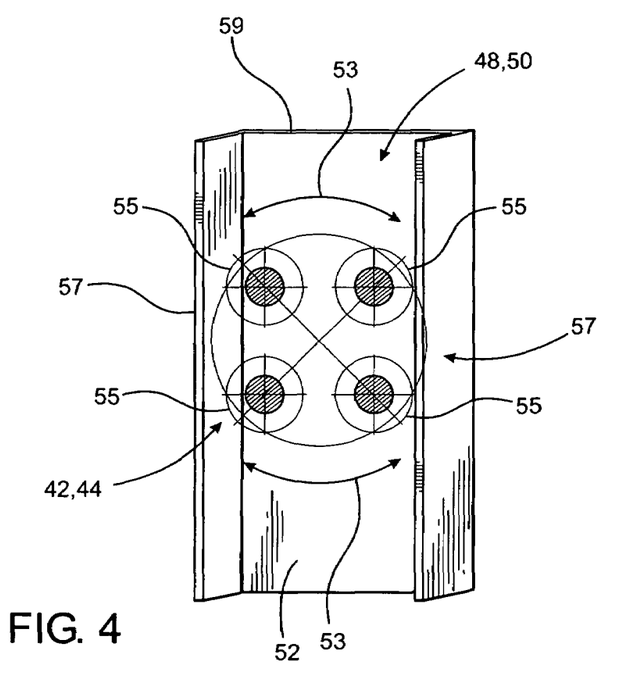
FIG. 4 is a perspective detailed view of a portion of a connector assembly disposed and structured to rotationally support the seat assembly in a manner represented in the preferred embodiment of FIG. 1.

Again with reference to FIGS. 1-3, the connecting structures 42 and 44 of the connector assembly 40 are also removably connected to opposite sides 18 and 18' of the housing 14 of the seat assembly 12 by cooperative structuring with each of two receiving portions 48 in the form of a rail disposed on each of the sides 18 and 18'. Each of the receiving portions 48, represented in detail in FIG. 4, is structured in the form of a rail or like member 50 having an interior 52 dimensioned and configured to receive a corresponding one of the two connecting structures 42 and 44. As such, the placement of the connecting structures 42 and 44 on the interior of the rail like receiving member 48, 50 facilitates rotational or pivotal motion of the housing 14 of the seat assembly 12 in opposite directions about the first rotational axis 46, as schematically indicated by directional arrows 53. Accordingly, the operation and structure of the two connecting structures 42 and 44 of the connector assembly 40 at least partially defines the first rotational axis 46 which facilitate rotational or pivotal travel or movement of the seat assembly 12 between the arms 32 and 34.

The structure of the two connecting structures 42 and 44 and their interaction with the rail like receiving member 48 and 50 is such as to facilitate rotation thereof as indicated by directional arrows 53. More specifically, as the seat assembly rotates or pivots, for example about axis 46, a plurality of wheels or rollers 55 of each connecting structures 42 and 44 will engage the inner surfaces of the side flanges 57 of the corresponding receiving member 48 and 50, thereby facilitating relative movement there between. The receiving members 48 are fixed to opposite sides of the seat assembly 12 so as to be aligned with and removably connected to correspondingly disposed ones of the two connecting structures 42 and 44. Accordingly, rotation of the seat assembly in opposite directions will still be permitted while the wheels, roller members or like structures 55 will be movable relative to the interior surfaces of the side flanges 57 of the receiving members 48 and 50.

Figure 5:
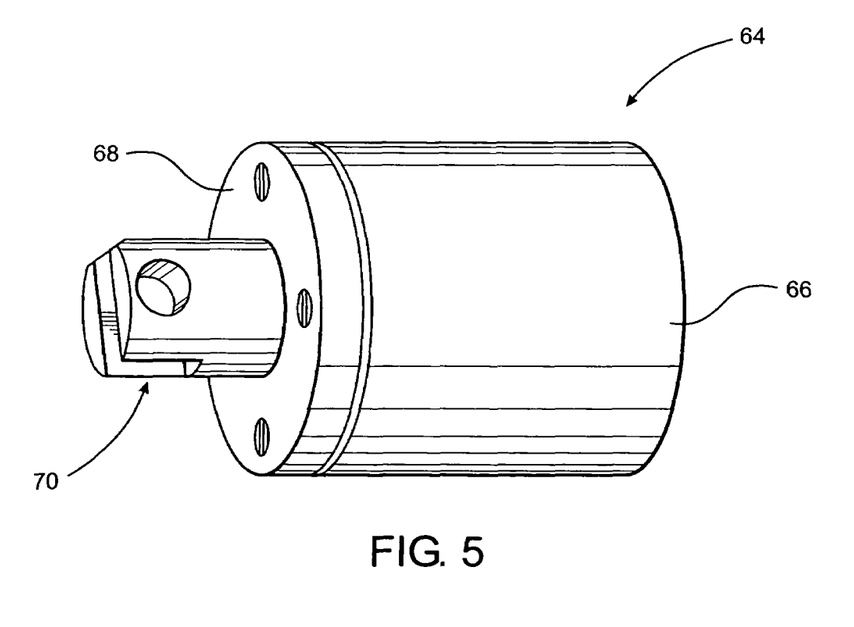
FIG. 5 is a perspective view of an attachment assembly which comprises at least a portion of a mount assembly associated with a preferred embodiment of FIG. 1.
Figure 6:
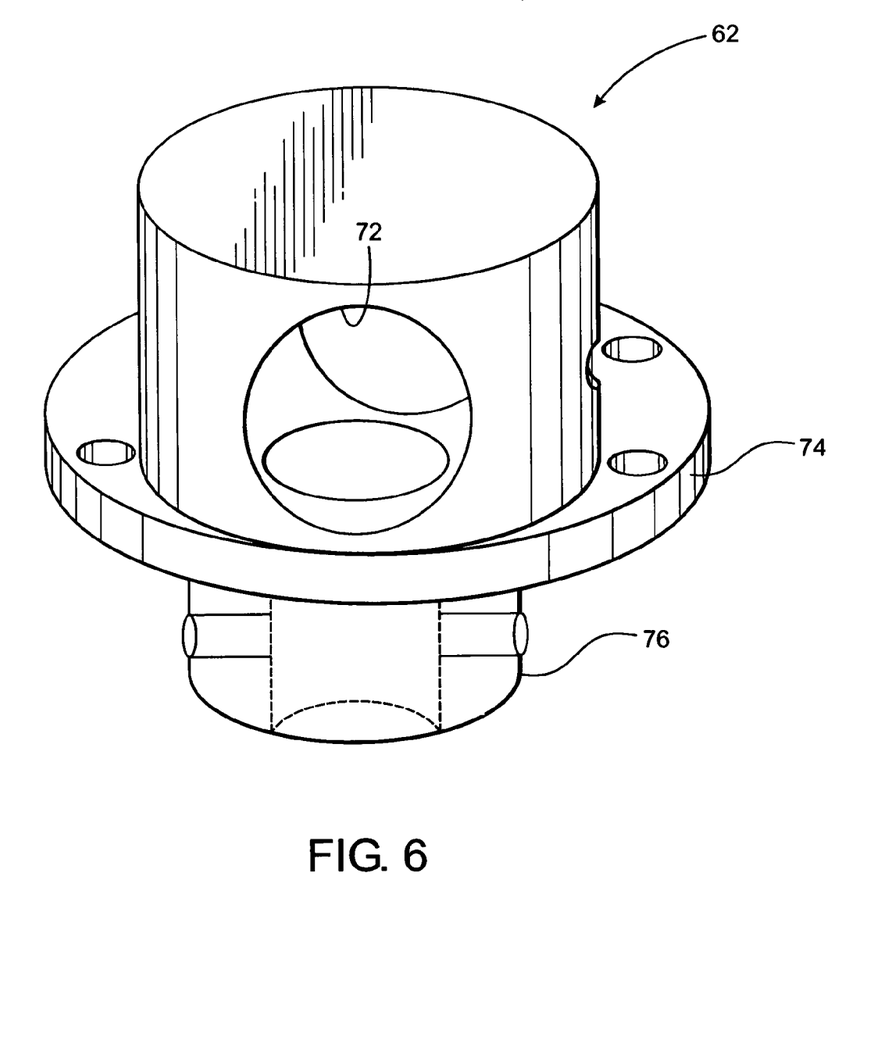
FIG. 6 is a detailed perspective view of a base portion of a mount assembly operatively and structurally associated with the embodiment of FIG. 5.

With primary reference to FIGS. 1, 5 and 6, additional features of the seat assembly 10 include the provision of a mount assembly generally indicated as 60. The mount assembly 60 includes a base portion generally indicated as 62 and represented in detail in FIG. 6. In addition, the mount assembly 60 includes an attachment assembly generally indicated as 64 and represented in detail in FIG. 5. The attachment assembly 64 includes an outer casing 66 having a hollow interior portion dimensioned and configured to house or contain a bearing assembly which facilitates rotational movement of the attachment portion 68 of the attachment assembly 64. Moreover, the attachment portion 68 and the connecting link 70 are capable of rotational movement through an entire 360° range of motion relative to the housing or casing 66 of the mount assembly 64. More specifically, the interior of the casing 66 is at least partially hollow to accommodate the aforementioned one or more bearing assemblies and may be at least partially filled with grease, heavy oil or other fluid which serves as a shock absorbing material. Such shock absorbing fluid, by allowing rotation of the link 70 and attachment portion 68 relative to the housing 66, will have the effect of at least partially limiting such rotational movement at least to the extent of "slowing" the relative rotation of the attachment portion 68 and link 70 relative to the casing 66.

When operatively assembled the casing 66 is disposed on the interior of the base portion 62 such as being frictionally or otherwise fitted into an interior portion 72 of the base portion 62. Further, the base portion 62 includes an anchoring plate 74 and an anchoring platform as at 76 serving to fixedly connect or secure the base portion 62 to the vehicle either by means of a pedestal generally indicated as 78 in FIG. 1 or by other means which will be described in greater detail hereinafter. Accordingly, the mount assembly 60 is at least partially, fixedly secured to the vehicle by means of the base portion 62 anchored to a support structure such as, but not limited to, the pedestal 78. In the embodiment of FIG. 1, the pedestal 78 includes an elongated stanchion or support shaft 79 and an anchoring plate 80 fixedly secured to the floor or other appropriate portion of a watercraft or other vehicle.

However, as set forth above, the attachment member 64 is structured to rotate relative to the base portion 62 and other remaining portions of the mount assembly 60. As such, the attachment portion 68 of the attachment assembly 64 is connected to a stub or like mechanical member 84 fixedly secured to the brace 36 of the support frame 30. Fixed but removable interconnection of the link 70 associated with the attachment assembly 64 to the mechanical link or like cooperative member 84, fixedly attached to the brace 36 of the support frame 30, will facilitate the intended rotational or pivotal attachment of the support frame 30 to the mount assembly 60 and accordingly to the watercraft or other vehicle.

Therefore, the support frame 30 is rotationally or pivotally connected to the mount assembly 60 by virtue of structural and operative features of the mounting of the attachment assembly 64. Therefore, the support frame 30 can be accurately described as rotating about a second rotational axis 46', schematically represented in FIG. 3. Further, the cooperative disposition and structuring of the connector assembly 40, defined by the connector structure 42 and 44, as well as the attachment assembly 64 being rotational relative to the mount assembly 60, serves to orient the first rotational axis 46 and the second rotational axis 46' in perpendicular relation to one another. As also schematically represented the first rotational axis 46 and the second rotational axis 46' may be oriented in substantially or at least partially intersecting relation to one another. The perpendicular and possibly intersecting orientation of the first and second rotational axis 46 and 46' relative to one another thereby serves to facilitate a "gimbal-like" range of travel or motion of the seat assembly 12 relative to the watercraft or vehicle in which the safety seat assembly 12 is mounted. The seat assembly 12 thereby accommodates or overcomes the lateral and/or fore and aft movement of the watercraft as it travels over a body of water, even during rough water or severe weather conditions.

Yet another structural and operative feature of the safety seat assembly 10 comprises the detachment and more specifically, the "automatic" detachment of the seat assembly 12 from the support frame 30 during emergency conditions, such as a flooding or swamping of the watercraft, on which the safety seat assembly 10 is used. As set forth above, the seat assembly 12 includes the float assembly 26 integrally or otherwise considered a part of the housing 14. When the watercraft is flooded, swamped or otherwise takes on sufficient water, the float assembly 26 serves to buoyantly support the seat assembly 12 on the surface of the water rather than the seat assembly 12 being primarily supported on or connected to the support frame 30. Moreover, an automatic detachment of the seat assembly 12 from the support frame 30 will occur. Such automatic detachment is facilitated by the cooperative structuring of each of the connector structures 42 and 44 with the rail like receiving structures 48, 50 as represented in FIG. 4.

More specifically, when the water on the interior of the watercraft is sufficient to facilitate support of the seat assembly 12 by the float assembly 26, the seat assembly 12 will be automatically oriented to be detached from the support frame 30. Accordingly, when the seat assembly 12 is so disposed relative to the support frame 30, an automatic detachment of the connector structures 42 and 44 from the receiving structures 48, 50 will occur. This will allow the connectors 42 and 44 to substantially "rise" or be "lifted" out of an open end 59 of corresponding ones of the rail like receiving structures 48 or 50 regardless of the orientation of the seat assembly 12 when floating on the surface of the incoming water. The seat assembly 12 will then be able to float free of the support frame 30, mount assembly 60 and/or pedestal 78, etc.

When so detached, the float assembly 26 is disposed and structured intermediate opposite ends of the housing 14 of the seat assembly 12 to maintain the occupant in an "occupant-safe" orientation as it is being buoyantly supported on the surface of a body of water. Such an occupant-safe orientation is such that the head and possibly the upper torso area of the occupant, while being retained on the open interior 16 of the housing 14, will be maintained above water. Therefore the occupant will be able to breathe freely, even though the seat assembly 12 is buoyantly supported on the body of water by the float assembly 26 and detached from the support frame 30 and a reminder of the safety seat assembly 10.

With primary reference to FIG. 1, the aforementioned pedestal assembly 78 includes the elongated stanchion or support shaft 79 anchored to the floor or other appropriate portion of the marine craft by an anchoring plate 80 and fixedly interconnects the base portion 62 of the mount assembly 60 to the watercraft. Further, the pedestal assembly 78 and more specifically, the stanchion 79 is of a sufficient dimension to dispose the seat assembly 12, when operatively supported by the support frame 30 and mount assembly 60, in a spaced, somewhat suspended orientation relative to floor or other portions of the watercraft or vehicle. This spaced, suspended orientation of the seat assembly 12 further facilitates the ability of the seat assembly 12 to travel or move in gimbal-like manner relative to a remainder of the watercraft or vehicle with which it is used. An occupant within the open interior 16 of the housing 14 is thereby maintained in an intended upright yet seated position, regardless of the movement of the watercraft as it travels over a body of water.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly for safely supporting an occupant in a vehicle, said assembly comprising:
   a seat assembly,
   a support frame connected to said seat assembly and structured to enable rotational movement of said seat assembly about a first rotational axis,
   a mount assembly connected to said support frame and structured to facilitate rotational movement of said support frame about a second rotational axis,
   said support frame and said mount assembly cooperatively disposed and structured to define a substantially perpendicular orientation of said first and second rotational axes relative to one another, a connector assembly mounted on said support frame and disposed and structured to removably and rotationally interconnect said seat assembly to said support frame, said seat assembly including a housing having a float assembly disposed at least partially within said housing and structured to buoyantly support said seat assembly, and said float assembly and said connector assembly cooperatively disposed and structured to enable automatic detachment of said seat assembly from said support frame upon buoyant support of said seat assembly by said float assembly into a predetermined range of orientations.

2. An assembly as recited in claim 1 wherein said support frame comprises a substantially bifurcated construction including two spaced apart arms, each of said arms rotationably connected to a different side of said seat assembly by said connector assembly.

3. An assembly as recited in claim 2 wherein said bifurcated construction includes a brace member interconnecting said arms, said brace member rotationably connected to said mount assembly.

4. An assembly as recited in claim 1 wherein said connector assembly is disposed and structured to rotationally support said seat assembly about said first rotational axis and between said two arms.

5. An assembly as recited in claim 1 wherein said float assembly is disposed and structured to buoyantly support said seat assembly in an occupant safe orientation relative to the surface of a body of water when detached from said support frame.

6. An assembly as recited in claim 1 further comprising an attachment assembly rotationally connecting said support frame to a portion of said mount assembly.

7. An assembly as recited in claim 6 wherein said mount assembly includes a base portion fixedly attached to the vehicle; said attachment assembly supporting and rotationally interconnecting said support frame to said base portion.

8. An assembly as recited in claim 7 further comprising a pedestal fixedly secured to the vehicle and extending outwardly therefrom a sufficient distance to facilitate disposition of said seat assembly in a spaced, outwardly suspended orientation relative to the vehicle.

9. An assembly as recited in claim 8 wherein said base portion is fixedly secured to said pedestal.

10. An assembly as recited in claim 1 further comprising a pedestal fixedly interconnecting at least a portion of said mount assembly to the vehicle, said pedestal extending outwardly from the vehicle a sufficient distance to facilitate disposition of said seat assembly in a suspended, outwardly spaced relation to the vehicle.

11. An assembly as recited in claim 1 wherein said housing comprises an open interior portion dimensioned and configured to receive an occupant therein; said float assembly disposed within and extending along a back and opposite side portions of said housing.

12. An assembly as recited in claim 11 wherein said float assembly comprises a closed, hollow chamber formed within an interior of said body intermediate opposite ends of said seat assembly.

13. An assembly for safely supporting an occupant in a vehicle, said assembly comprising:

a seat assembly and a support frame, a connector assembly disposed and structured to movably interconnect said seat assembly to said support frame along a first rotational axis, said support frame comprising a substantially bifurcated construction including two spaced apart arms, said connector assembly comprising two connecting structures each mounted on a different one of said arms, said two connecting structures disposed and structured to removably and rotationally interconnect each of said two arms to a different side of said seat assembly, said two connecting structures at least partially defining said first rotational axis, a mount assembly connected to the vehicle and including an attachment assembly disposed and structured to rotationally interconnect said two arms of said support frame to a remainder of said mount assembly along a second rotational axis, and said connector assembly and said attachment assembly cooperatively disposed to orient said first and second rotational axes in substantially perpendicular and intersecting relation to one another for concurrent rotation of the seat assembly relative thereto.

14. An assembly as recited in claim 13 wherein said seat assembly further comprises a float assembly disposed and structured to buoyantly support said seat assembly in an occupant safe orientation relative to the surface of a body of water.

15. An assembly as recited in claim 14 wherein said connector assembly is structured to facilitate automatic detachment of said seat assembly from said support frame upon said buoyant support of said seat assembly into a predetermined range of inclined orientations.

16. An assembly as recited in claim 13 further comprising a pedestal fixedly secured to the vehicle and extending outwardly therefrom a sufficient distance to facilitate disposition of said seat assembly in a spaced, outwardly suspended orientation relative to the vehicle.

17. An assembly as recited in claim 16 wherein said base portion is fixedly secured to said pedestal.

18. An assembly as recited in claim 13 wherein said float assembly disposed and structured to buoyantly support said seat assembly in an occupant safe orientation relative to the surface of a body of water when detached from said support frame.

* * * * *